(12) United States Patent
Blomquist et al.

(10) Patent No.: US 6,768,839 B2
(45) Date of Patent: Jul. 27, 2004

(54) TUNABLE, POLYMERIC CORE, FIBER BRAGG GRATINGS

(75) Inventors: Robert Blomquist, Whippany, NJ (US); Robert Norwood, West Chester, PA (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 135 days.

(21) Appl. No.: 09/952,372

(22) Filed: Sep. 14, 2001

(65) Prior Publication Data

US 2003/0053774 A1 Mar. 20, 2003

(51) Int. Cl.[7] .................................................. G02B 6/34
(52) U.S. Cl. .................................... 385/37; 385/123
(58) Field of Search .................................. 385/37, 123

(56) References Cited

U.S. PATENT DOCUMENTS

| | | | |
|---|---|---|---|
| 5,007,705 A | 4/1991 | Morey et al. | 350/96.29 |
| 5,111,526 A | 5/1992 | Yamamoto et al. | 385/145 |
| 5,327,515 A | 7/1994 | Anderson et al. | 385/123 |
| 5,557,702 A | 9/1996 | Yoshikawa et al. | 385/143 |
| 6,303,040 B1 * | 10/2001 | Oh et al. | 216/24 |
| 6,306,563 B1 * | 10/2001 | Xu et al. | 430/321 |

OTHER PUBLICATIONS

Peng–G, et l., "Polymer Optical Fiber Photosensitivity and Highly Tunable Optical Fiber Bragg Grating", Proceedings of the SPIE, The International Society for Optical Engineering, vol. 4110; 2000; p. 123–38.

Xiong–Z. et al., "Highly Tunable Bragg Gratings in Single–Mode Polymer Optical Fibers", IEEE–Photonics Technology Letters, vol. 11, No. 3, Mar. 1999, p. 352–4.

Xiong–Z, et al., "73nm Waveguide Tuning in Polymer Optical Fiber Bragg Gratings", Proceedings ACOFT '99, 24th Australian Conference on Optical Fibre Technology, co–located with AOS '99, the Australian Optical Society Annual Conference. IREE Soc., Milsons Point, NSW Australia; 1999; 132 pp.

* cited by examiner

Primary Examiner—Mark A. Robinson
Assistant Examiner—Alessandro Amari

(57) ABSTRACT

Provided are polymeric or polymeric and glass optical fiber devices which have a tunable wavelength response in a polymeric fiber Bragg grating. An optical fiber is formed having a tubular cladding of a first polymeric or glass composition having a first index of refraction, wherein the cladding has a longitudinal axis. A core of a second polymeric composition is within the cladding and extends along and around the longitudinal axis. The second polymeric composition has a second index of refraction which is greater than the index of refraction of the first polymeric composition. A Bragg grating having a plurality of spaced grating elements is formed in the core. The arrangement then has a means, such as a heater, for changing the spacing between the grating elements.

19 Claims, 1 Drawing Sheet

US 6,768,839 B2

TUNABLE, POLYMERIC CORE, FIBER BRAGG GRATINGS

BACKGROUND OF THE INVENTION

1. Field of the Invention

The invention relates to an optical fiber devices. More particularly, the invention pertains to polymeric optical fiber devices which have a tunable wavelength response in a polymeric fiber Bragg grating.

2. Technical Background

Optical fibers are key components in modern telecommunications systems. Optical fibers are thin strands of glass or polymer capable of transmitting an optical signal containing a large amount of information over long distances with very low loss. Communication systems now increasingly employ optical fibers which, because of their high speed, low attenuation and wide bandwidth characteristics, can be used for carrying data, video and voice signals concurrently. In essence, an optical fiber is a small diameter waveguide characterized by a core with a first index of refraction surrounded by a cladding having a second lower index of refraction. Light rays which impinge upon the core at an angle less than a critical acceptance angle undergo total internal reflection within the fiber core. These rays are guided along the axis of the fiber with minimum attenuation. Typical optical fibers are made of high purity silica with minor concentrations of dopants to control the index of refraction, or polymers such as acrylates, methacrylates, epoxies or vinyl ethers.

An important extension of these communication systems is the use of wavelength division multiplexing, by which a given wavelength band is segmented into separate wavelengths so that multiple signals can be carried on a single installed line. Modern fiber optic communication systems often have the ability to simultaneously transfer light signals having differing wavelengths over a single optical fiber. A typical optical fiber communications system comprises a source of optical input signals, a length of optical fiber coupled to the source and a receiver for optical signals coupled to the fiber. In multiwavelength systems a plurality of nodes may be provided along the fiber for adding or dropping wavelength channels.

Multiwavelength systems require the use of multiplexers and demultiplexers which are capable of dividing the band into given multiples of different wavelengths which are separate but closely spaced. Adding individual wavelengths to a wideband signal, and extracting a given wavelength from a multi-wavelength signal, require wavelength selective couplers, and this has led to the development of a number of add/drop filters. Optical fiber Bragg gratings are important elements for selectively controlling specific wavelengths of light within an optical fiber. Fiber Bragg gratings are a particularly advantageous structure for differentiating and manipulating optical signals based on their wavelength. Fiber Bragg gratings are often formed by selectively exposing photosensitive fiber to light, thereby creating a permanent refractive-index grating along the core of the fiber. A typical Bragg grating comprises a length of optical fiber including a plurality of perturbations in the index of refraction spaced along the fiber length. These perturbations selectively reflect light in a narrow wavelength range centered around wavelength $\lambda_{ref}$, where $\lambda_{ref}=2n_{eff}\Lambda$, and where $\Lambda$ is the periodic spacing between grating elements and $n_{eff}$ is the effective refractive index of the propagating mode. The remaining wavelengths pass essentially unimpeded.

Such Bragg gratings have found use in a variety of applications including filtering, stabilization of semiconductor lasers, reflection of fiber amplifier pump energy, and compensation for fiber dispersion.

A wavelength reflection phenomenon is brought about when light is transmitted through an optical fiber having Bragg gratings in its core region. If the wavelength of the light is in conformity with the Bragg condition, the transmitted light is reflected in the grating region of the optical fiber. Such an optical fiber is known as an intra-core fiber grating, which is in fact a wavelength filter or wavelength reflector. Fiber gratings can be widely used in optical fiber communication system and can be used as sensors and as reflective mirrors of laser cavities.

Conventional glass fiber Bragg gratings are conveniently fabricated by providing a silica glass fiber with one or more dopants sensitive to ultraviolet light, such as glass fibers having silica cores doped with germanium oxide, and exposing the fiber at periodic intervals to high intensity ultraviolet light from an excimer laser. The ultraviolet light interacts with the photosensitive dopant to produce perturbations in the local index of refraction. The appropriate periodic spacing of perturbations to achieve a conventional grating can be obtained by use of a physical mask, a phase mask, or a pair of interfering beams as is well known in the art.

One difficulty with conventional fiber Bragg gratings is that they filter only a fixed wavelength. Each grating selectively only reflects light in a narrow bandwidth centered around $\lambda_{ref}=2n_{eff}\Lambda$. However in many applications, such as multiplexing, it is desirable to have a tunable grating whose wavelength response can be controllably altered. The applications of the fiber gratings can be significantly broadened if the reflection light spectrum of the fiber gratings is tunable. The filtering condition of the grating can be changed if the length of the Bragg period of the fiber gratings is physically changed or if the effective refractive index of the waveguide is changed. A change in the Bragg period of fiber gratings may be brought about by exerting a tensile or compressive force on the grating, or by winding the grating containing fiber around a piezoelectric ceramic modulated by a voltage source. The effective refractive index of the waveguide can be changed by altering the temperature of the fiber grating region.

The difficultly with conventional glass fiber gratings is their limited tunability range. Attempts have been made to produce tunable glass fiber gratings using a piezoelectric element to strain the grating and thereby change the grating spacing. The response to strain of these glass fibers is typically less than ten nanometers at peak distortion. Because glass fibers have low values for the change in refractive index with temperature changes, the temperature tunability of these devices is also limited. The temperature responsiveness of glass devices over an almost 100° C. temperature range is usually less than four nanometers. It would be desirable to produce a fiber grating which can be tuned over a wider wavelength band.

The invention provides a relatively low loss polymeric fiber Bragg grating having a wider effective wavelength tunability band than prior art glass fiber Bragg gratings. While gratings in glass optical fibers have a maximum wavelength dependence of less than 0.04 nanometers per degree C in temperature change, gratings made in polymer waveguides have been found to have a temperature dependence of greater than 0.2 nanometers per degree C. In addition, polymers are capable of undergoing much larger ranges of elastic deformation than glass. As a consequence, changes in wavelength as a result of physical strain of the polymeric fiber Bragg grating are significantly greater than those for a glass fiber Bragg grating. In addition, polymers can be selected for fiber and grating formation which have an exceptionally low loss.

SUMMARY OF THE INVENTION

The invention provides an optical fiber comprising a tubular cladding which comprises a first polymeric or glass composition having a first index of refraction, wherein the cladding has a longitudinal axis. A core of a second polymeric composition is within the cladding and extends along and around the longitudinal axis. The second polymeric composition has a second index of refraction which is greater than the index of refraction of the first polymeric composition. A Bragg grating having a plurality of spaced grating elements is formed in the core. The arrangement then has a means for changing the spacing between the grating elements.

The invention also provides a method for forming an optical fiber which comprises forming a hollow tubular cladding which comprises a first polymeric composition or glass having a first index of refraction, wherein the cladding has a longitudinal bore. One then fills the bore with a core of a polymerizable composition through an open end of the hollow tubular cladding. One then partially polymerizes the polymerizable composition to form a second polymeric composition which has a second index of refraction greater than the index of refraction of the first polymeric composition. A Bragg grating having a plurality of spaced grating elements is then formed in the core. Means for changing the spacing between the grating elements is then provided.

The invention also provides a method for forming an optical fiber which comprises forming a hollow tubular cladding which comprises a first polymeric composition comprising a residual amount of a first actinic radiation polymerizable composition. The first polymeric composition has a first index of refraction, and the cladding has a longitudinal bore. One then fills the bore with a core of a second actinic radiation polymerizable composition through an open end of the hollow tubular cladding. One then partially polymerizes the second actinic radiation polymerizable composition to form a second polymeric composition which has a second index of refraction greater than the index of refraction of the first polymeric composition. Simultaneously one then forms a Bragg grating having a plurality of spaced grating elements in the core and an additional Bragg grating having a plurality of spaced grating elements in the cladding which is congruent with the Bragg grating in the core. This is done by exposure of the first polymeric composition and the second polymeric composition to two beam interference pattern of ultraviolet radiation, or exposure to ultraviolet radiation through a phase mask. One then provides means for changing the spacing between the grating elements.

The invention still further provides a method for forming an optical fiber which comprises forming a hollow tubular cladding which comprises a first glass composition having a first index of refraction, said cladding having a longitudinal bore. One then fills the bore with a core of a polymerizable composition through an open end of the hollow tubular cladding, and then partially polymerizes the polymerizable composition. A second polymeric composition is formed which has a second index of refraction greater than the index of refraction of the first glass composition. One then forms a Bragg grating having a plurality of spaced grating elements in the core and provides a means for changing the spacing between the grating elements.

DETAILED DESCRIPTION OF THE INVENTION

Figure 1:
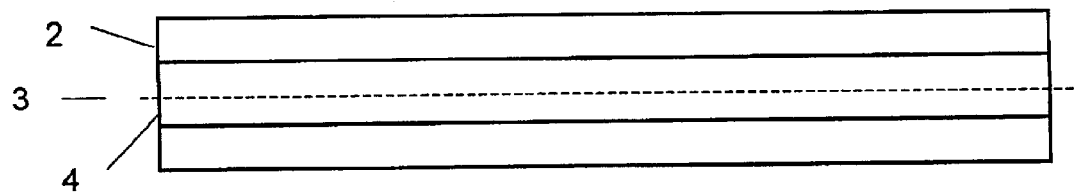
FIG. 1. shows an optical fiber having an outer cladding and an inner core.

In the method for forming the instant optical fiber arrangement, one begins by forming a tubular cladding 2 as shown in FIG. 1 which comprises a light-transmissive first polymeric or glass composition having a first index of refraction. The cladding has a longitudinal axis 3. The cladding may be formed from any suitable polymeric material or glass which is well known in the production of optical fibers. Such non-exclusively include acrylates, methacrylates, epoxies, vinyl ethers, germanium doped silica, etc. Useful acrylate compounds are described below. Techniques for forming such tubular fibers are well known in the art and may be formed, for example by melt extrusion through a tubular die. It is most desired for the present invention that the first polymeric composition forming the cladding be prepared by partially exposing an actinic radiation polymerizable composition such that it has some degree of residual photosensitivity. Alternatively, the cladding can be prepared using germanium doped silica.

A core 4 of a second polymeric composition is within the cladding and extends along and around the longitudinal axis. The second polymeric composition has a second index of refraction which is greater than the index of refraction of the first polymeric composition. The core may likewise comprise any suitable polymeric material which is well known in the production of optical fiber cores. Such non-exclusively include acrylates, methacrylates, epoxies, vinyl ethers, etc. Useful acrylate compounds are described below. Techniques for forming such filled tubular fibers are well known in the art and may be formed, for example by melt co-extrusion or coating a cladding composition around a formed core. In the most desirable case, a tubing 2 is formed first and then the core is filled, such as by capillary action, with an actinic radiation polymerizable composition, such as a photopolymerizable composition, followed by subsequent exposure to actinic radiation, such as ultraviolet radiation to partially polymerize the core composition. In the most desirable case, the core filled cladding comprises a single-mode optical fiber. An important feature of the invention is that the core 4 has an index of refraction $n_{core}$ which is greater than an index of refraction of the cladding $n_{clad}$. Since the cladding 2 may be absorbing at optical wavelengths of importance to telecommunications, any portion of the propagating light that reaches the cladding 2 is subject to absorption. Absorption of light by the cladding 2 leads to an undesirable loss of optical power from the propagating signal.

Usually the cladding has an outside diameter ranging from about 50 $\mu$m to about 1000 $\mu$m, and more usually from about 125 $\mu$m to about 250 $\mu$m. Usually the core has an outside diameter ranging from about 2 μm to about 950 μm, and more usually from about 6 μm to about 10 μm.

The inside surface of the clad forms the outside surface of the filled core. Usually cores have a circular or elliptical cross section although other shapes such as a square or rectangle are possible. If the shape is elliptical, it is usual that the length of the long axis of the ellipse be no more than about twice the length of the short axis of the ellipse. It is preferred that the core has a cross-sectional size such that the waveguide is single-mode for all optical communication wavelengths greater than about 1300 nm, desirably greater than about 1520 nm.

The cladding and core are best formed using photopolymerizable optical materials that include mixtures of photoinitiators with monomeric and/or oligomeric components which are blended to provide a desired index of refraction after exposure to actinic radiation. The particular index of refraction for each of the cladding and core has a significant effect on the performance of the optical fiber. In the usual applications of the invention, the structures produced are single-mode.

Generally, the refractive index $n_{core}$ of the core 4 is in the range of from about 0.1% higher to about 10.0% higher than the cladding, or more usually from about 0.25% to about 4.0% higher than the cladding.

The compositions used to form each of the cladding layer 2 and core 4 each may comprise a photopolymerizable compound and a photoinitiator. The photopolymerizable compound may be a monomer, oligomer or polymer which is an addition polymerizable, nongaseous (boiling temperature above 30° C. at normal atmospheric pressure), ethylenically unsaturated compound containing at least one terminal ethylenically unsaturated group, and is capable of forming a high molecular weight polymer by free radical initiated, chain propagating addition polymerization. Such compounds are well known in the art. They are selected such that the formed polymerized element has the desired refractive index as described above. The determination of the refractive index for the particularly selected polymerized compositions are easily determinable by those skilled in the art.

Multifunctional acrylate monomers are suitable. The generalized structure of the multifunctional acrylates is given below:

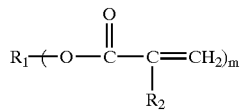

For the core, m may range from 1 to about 6; $R_2$ is H or $CH_3$, and $R_1$ is a linkage of aliphatic, aromatic or aliphatic and aromatic mixed organic molecular segments. Suitably $R_1$ is an alkylene, alkylene oxide, arylene oxide, aliphatic polyether or polyester moiety and $R_2$ is preferably H. To ensure low crosslinking density, monomers with $1 \leq m \leq 3$, ideally m=2, and long linkage segments between two ethylenically unsaturated functionalities are useful. For this invention, long linkage segments are those which have an average molecular chain length of at least about 4 carbon atoms or larger and suitably 6 or larger. Suitable flexible linkage structures include alkylenes with chain length larger than about 3 carbon atoms, poly(ethylene oxide), poly (propylene oxide), ethoxylated bisphenol A, polyethers, thioethers, aliphatic and aromatic hydrocarbons, ethers, esters and polysiloxanes, etc. These may optionally be substituted with any pendant group which does not detract from the ability of the polymerizable compound to photopolymerize or add undue loss at the light wavelengths of interest, e.g., wavelengths of 1.31 and 1.53–1.63 microns for telecommunications. Suitable substitutes nonexclusively include alkyl, aryl, alkoxy and sulfoxide groups, etc. To ensure high resistance to thermal degradation and discoloration, thermally stable molecular structures of $R_1$ are suitable. Such $R_1$ segments should be free of thermally susceptible moieties such as aromatic urethane and amide groups. To ensure low birefringence, $R_1$ linkages with low stress optic coefficient and optical polarizability are usual.

For the cladding, the acrylate is also as described above, however, the average molecular chain length between ethylenically unsaturated functionalities may be about 6 carbon atoms or longer, usually 8 or longer and more suitably 12 or longer. Suitable flexible linkage structures include alkylenes with chain length larger than 6 carbon atoms, poly(ethylene oxide), poly(propylene oxide) and ethoxylated bisphenol A.

In an embodiment of the invention, materials for each the core layer 4 and cladding layer 2 include polymerizable esters and partial esters of acrylic acid and of aromatic and aliphatic polyols containing 2 to 30 carbon atoms. The partial esters and esters of polyoxyalkylene glycols are also suitable. Examples are ethylene glycol diacrylate, diethylene glycol diacrylate, triethylene glycol diacrylate, tetraethylene glycol diacrylate, polyethylene glycol diacrylates and polypropylene glycol diacrylates having an average molecular weight in the range from 200 to 2000, propylene glycol diacrylate, dipropylene glycol diacrylate, ($C_2$ to $C_{40}$)alkane diol diacrylates such as hexanediol diacrylate, and butanediol diacrylate, tripropylene glycol diacrylate, trimethylolpropane triacrylates, ethoxylated trimethylolpropane triacrylates having an average molecular weight in the range from 500 to 1500, pentaerythritol diacrylate, pentaerythritol triacrylate, pentaerythritol tetraacrylate, dipentaerythritol diacrylate, dipentaerythritol triacrylate, dipentaerythritol tetraacrylate, dipentaerythritol pentaacrylate, dipentaerythritol hexaacrylate, tripentaerythritol octaacrylate, sorbitol triacrylate, sorbitol tetraacrylate, sorbitol pentaacrylate, sorbitol hexaacrylate, oligoester acrylates, glycerol di- and triacrylate, 1,4-cyclohexane diacrylate, bisacrylates of polyethylene glycols having an average molecular weight from 100 to 1500, and mixtures of the above compounds. Multifunctional acrylate oligomers include, but are not limited to acrylated epoxies, acrylated polyurethanes and acrylated polyesters. Photopolymerizable compounds include aryl acrylates. Illustrative of such aryl acrylate monomers are aryl diacrylates, triacrylates and tetraacrylates as for example di, tri and tetraacrylates based on benzene, naphthalene, bisphenol A, biphenylene, methane biphenylene, trifluoromethane biphenylene, phenoxyphenylene and the like. The aryl acrylate monomers may be multifunctional aryl acrylates and more usually aryl acrylate monomers are di, tri and tetra acrylates based on the bisphenol-A structure. Usual aryl acrylate monomers are alkoxylated bisphenol-A diacrylates such as ethoxylated bisphenol-A di-acrylate, propoxylated bisphenol A diacrylates and ethoxylated hexafluorobisphenol-A diacrylates. The aryl acrylate monomers of choice are ethoxylated bisphenol-A diacrylates. Desired polymerizable components are monomers having the structure (I):

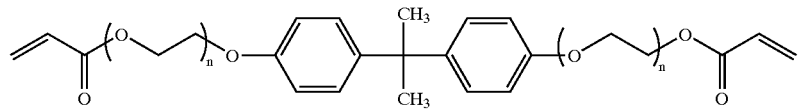

In one embodiment, for the core, n is about 10 or less, usually about 4 or less and more suitably about 2 or less. In one embodiment, for the cladding, n is about 2 or more, usually about 4 or more and more suitably about 10 or more. Also useful are acrylate containing copolymers which are well known in the art. In an embodiment, the cladding layer comprises a polymerizable component which has the ethoxylated bisphenol A disacrylate structure (I) shown above wherein $1 \leq n \leq 20$, usually $4 \leq n \leq 15$, and more suitably $8 \leq n \leq 12$.

Desirably, at least one of the first polymeric composition and the second polymeric composition comprise a polymer or copolymer of a polymerizable compound including at least one fluorinated alkylene or alkylene ether moieties, and at least two terminal acrylate moieties, each terminal acrylated moiety being connected to one of the fluorinated alkylene or fluorinated alkylene ether moieties by an ester linking group. The polymerizable compositions may be multifunctional fluorinated (meth)acrylates, particularly those based on the following structures:

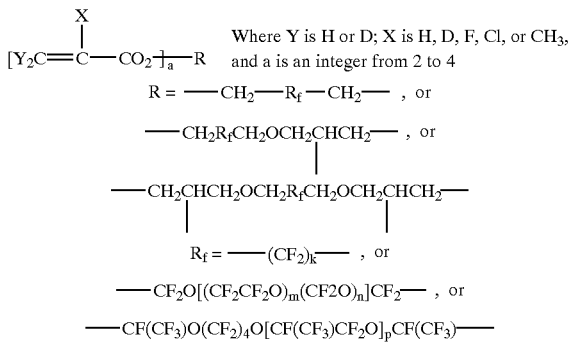

Where Y is H or D; X is H, D, F, Cl, or $CH_3$, and a is an integer from 2 to 4

Where k, m, n, and p are integers

These materials produce optical fibers with propagation losses of as little as 0.17 dB/cm at 1550 nanometers. The glass transition temperatures (Tg) of these materials can be easily selected to be below the operating temperature of thermo-optic devices. Low Tg versions of these materials have been shown to have negligible birefringence by grating assisted measurements, and to possess a high value of the temperature derivative of refractive index, which allows the fabrication of power efficient thermo-optic devices such as optical switches and tunable gratings. Useful fluorinated (meth)acrylates include, for example, a tetraacrylate F60TA made from the polyol, Fluorolink® T, which is commercially available from Ausimont S.p.A. of Milan ITALY according to the reaction which is shown below:

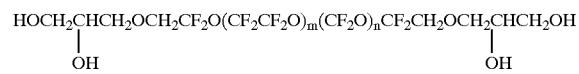

Fluorolink-T

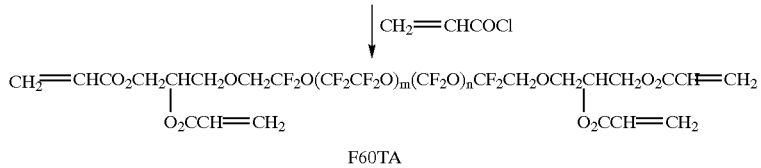

F60TA

Other multifunctional acrylates include C6DIACRY From Akzo Chemicals B.V. of Amersfoort Netherlands:

L-12043 from the 3M Company of Saint Paul, Minn.:

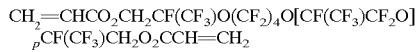

L-9367 similarly from the 3M Company:

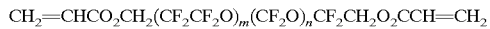

Although each of the cladding and core may be comprised of structurally similar compositions, in order for the cladding to have a refractive index which is lower than the refractive index of the core, it must have different chemical compositions for any individual application. For example, the core composition may have a similar Tg property as the cladding, but need not be the identical composition.

It is a feature of the present invention that the photopolymerizable compounds to be used in the core produce a core which after polymerization has a glass transition temperature of about 80° C. or less and suitably about 50° C. or less. It is a feature of the present invention that the photopolymerizable compounds to be used in the cladding produce a cladding which after polymerization have a glass transition temperature of about 60° C. or less, usually about 40° C. or less and more suitably about 25° C. or less. The particular Tg may be easily obtained by the skilled artisan by characterization and selection of the polymerizable component. This depends on such factors as the molecular weight, number of sites of unsaturation and crosslink density of the polymerizable component. A single polymerized component may itself have the requisite Tg, or the polymerizable component may be tailored by blending mixtures of polymerizable monomer, oligomers and/or polymers having the desired Tg. The Tg may also be controlled by varying the exposure time and temperatures at which polymerization is conducted.

The photopolymerizable compound is present in each photopolymerizable composition in an amount sufficient to photopolymerize upon exposure to sufficient actinic radiation. The amount of the photopolymerizable compound in the composition may vary widely and amounts normally used in photopolymerizable compositions for use in the preparation of photopolymers for use as the light-transmissive element of light-transmissive devices may be used. The amount of photopolymerizable compound is generally used in an amount of from about 35 to about 99.9% by weight of the composition. Usually the photopolymerizable compound is present in the overall composition in an amount of from about 80% to about 99.5% by weight, and more suitably from about 95 to about 99% based on the weight of the overall composition.

Each light-sensitive composition further comprises at least one free radical generating photoinitiator which photolytically generates free radicals. Usually the photoinitiator is a free radical generating addition polymerization initiator activated by actinic light and is thermally inactive near room temperature (e.g. from about 20° C. to about 80° C.) Any photoinitiator which is known to photopolymerize acrylates can be used. Photoinitiators nonexclusively include quinoxalin compounds; vicinage polyketaldonyl compounds, alpha-carbonyls; acyloin ethers; triarylimidazolyl dimers; alpha-hydrocarbon substituted aromatic acyloins; polynuclear quinones; and s-triazines as are known in the art.

Suitable photoinitiators include aromatic ketones such as benzophenone, acrylated benzophenone, 2-ethylanthraquinone, phenanthraquinone, 2-tert-butylanthraquinone, 1,2-benzanthraquinone, 2,3-benzanthraquinone, 2,3-dichloronaphthoquinone, benzyl dimethyl ketal and other aromatic ketones, e.g. benzoin, benzoin ethers such as benzoin methyl ether, benzoin ethyl ether, benzoin isobutyl ether and benzoin phenyl ether, methyl benzoin, ethyl benzoin and other benzoins. Photoinitiators include 1-hydroxycyclohexylphenyl ketone (Irgacure® 184), benzoin, benzoin ethyl ether, benzoin isopropyl ether, benzophenone, benzodimethyl ketal (Irgacure 651), 2,2-diethyloxy acetophenone, 2-hydroxy-2-methyl-1-phenylpropan-1-one (Darocur® 1173), available from E. Merck of Darmstadt, Germany; 1-[4-(2-hydroxyethoxy)phenyl]-2-hydroxy-2-methylpropan-1-one (Darocur® 2959), 2-methyl-1-[(4-methylthio)phenyl]-2-morpholinopropan-1-one (Irgacure® 907), 2-benzyl-2-dimethylamino-1-(4-morpholinophenyl)-butan-1-one (Irgacure® 369), poly{1-[4-(1-methylvinyl)phenyl]-2-hydroxy-2-methyl-propan-1-one} (Esacure KIP), [4-(4-methylphenylthio)phenyl]phenylmethanone (Quantacure® BMS) from Great Lake Fine Chemicals Limited Of London, England, and di-campherquinone. The most suitable photoinitiators are those which tend not to yellow upon irradiation. Such photoinitiators include benzodimethyl ketal (Irgacure® 651), 2-hydroxy-2-methyl-1-phenylpropan-1-one (Darocur® 1173), 1-hydroxy-cyclohexyl-phenyl ketone (Irgacure® 184), and 1-[4-(2-hydroxyethoxy)phenyl]-2-hydroxy-2-methyl-propan-1-one (Darocur 2959). Fluorolink®-T and C6DIACRYL are sufficiently miscible that conventional photoinitiators can be used for UV curing. For the more highly fluorinated multifunctional acrylates, such as materials L-12043 and L-9367 from 3M, a fluorinated photoinitiator may be used.

The free radical generating photoinitiator is present in each photopolymerizable composition in an amount sufficient to effect photopolymerization of the photopolymerizable compound upon exposure to sufficient actinic radiation. The photoinitiator is generally present in an amount of from about 0.01% to about 10% by weight of the overall composition, or more usually from about 0.1% to about 6% and more suitably from about 0.5% to about 4% by weight based on the total weight of the composition.

Other additives may also be added to the photosensitive compositions depending on the purpose and the end use of the light-sensitive compositions. Examples of these include solvents, antioxidants, photostabilizers, volume expanders, fillers such as for example silica, titania, glass spheres and the like (especially when in the nanoscale regime, that is, having a particle size less than about 100 nm), dyes, free radical scavengers, contrast enhancers, nitrones and UV absorbers. Antioxidants include such compounds as phenols and particularly hindered phenols including Irganox® 1010 from Ciba-Geigy Corporation Corporation of Tarrytown N.Y.; sulfides; organoboron compounds; organophosphorous compounds; N,N'-hexamethylenebis(3,5-di-tert-butyl-4-hydroxyhydrocinnamamide) available from Ciba-Geigy under the tradename Irganox® 1098. Photostabilizers and more particularly hindered amine light-stabilizers include but are not limited to poly[[(6-morpholino-s-triazine-2,4-diyl)[(2,2,6,6,-tetramethyl-4-piperidyl)imino]-hexamethylene [(2,2,6,6,-tetramethyl-4-piperidyl)imino)] available from Cytec Industries of Wilmington, Del. under the tradename "Cyasorb® UV-3346." Volume expanding compounds include such materials as the spiral monomers known as Bailey's monomer. Examples of dyes include methylene green, methylene blue, and the like. Suitable free radical scavengers include oxygen, hindered amine light-stabilizers, hindered phenols, 2,2,6,6-tetramethyl-1-piperidinyloxy free radical (TEMPO), and the like. Suitable contrast enhancers include other free radical scavengers such as nitrones. UV absorbers include benzotriazole, hydroxybenzophenone, and the like. These additives may be included in quantities, based upon the total weight of the composition, from about 0% to about 6%, and usually from about 0.1% to about 1%. All components of the overall composition are in admixture with one another, and most suitably in a substantially uniform admixture.

Usually the cladding is formed by melt extrusion of the first polymerizable composition followed by actinic radiation exposure. Once the core photosensitive composition is formed in the cladding, actinic radiation is directed onto the core. The core polymer is prepared by exposing the polymerizable composition to actinic radiation of the required wavelength and intensity for the required duration. As used herein "actinic radiation" is defined as light in the visible, ultraviolet or infrared regions of the spectrum, as well as electron beam, ion or neutron beam or X-ray radiation. Actinic radiation may be in the form of incoherent light or coherent light, for example, light from a laser. Sources of actinic light, and exposure procedures, times, wavelengths and intensities may vary widely depending on the desired degree of polymerization, the index of refraction of the photopolymer and other factors known to those of ordinary skill in the art. Such conventional photopolymerization processes and their operational parameters are well known in the art.

Sources of actinic radiation and the wavelength of the radiation may vary widely, and any conventional wavelengths and sources can be used. In one embodiment, the photochemical excitation be carried out with relatively short wavelength (or high energy) radiation so that exposure to radiation normally encountered before processing (e.g., room lights) will not prematurely polymerize the polymerizable material. Thus, exposure to ultraviolet light (300–400 nm wavelength) is convenient. Also, exposure by deep ultraviolet light (190–300 nm wavelength) is useful. Convenient sources are high pressure mercury-xenon arc lamps fitted with appropriate optical filters to select the desired wavelengths for processing. Also, short wavelength coherent radiation is useful for the practice of this invention. An argon ion laser operating in the UV mode at several wavelengths near 350 nm is desirable. Also, a frequency-doubled Argon ion laser with output near 257 nm wavelength is highly desirable. Alternatively, the processing can utilize a multiphoton process initiated by a high intensity source of actinic radiation such as a laser. It is also possible to cure the above fluorinated monomers without photoinitiators through the use of electron beam curing. Electron beam or ion beam excitation may be utilized. Exposure time normally varies from a few seconds to about 10 minutes. Temperatures usually range from about 10° C. to about 60° C., however, room temperature is more suitable. Additionally, these materials could be cured thermally through the use of peroxides or other thermal initiators.

According to the invention, the core and cladding are not fully cured at this point, but only partially polymerized. Partially polymerized means that some acrylate groups are present after polymerization, i.e., not all acrylates are converted to saturated hydrocarbons. This means that more than 0% of the number of acrylate groups, usually more than about 10%, and most suitably more than about 25% of the acrylate groups remain unreacted. The upper limit on the number of unreacted groups depends on the gel point of the monomer(s), which in turn depends on the functionality (the number of acrylate groups per monomer). If the functionality equals an integer, f, then the upper limit for unreacted groups is sufficient to cause gelation and is approximately given by the relation $(1-1/f)*100\%$. As an illustration, the number of remaining unreacted groups for a tetra-acrylate monomer be less than 75%, and the number of remaining unreacted groups for a diacrylate monomer be less than 50%.

Figure 2:
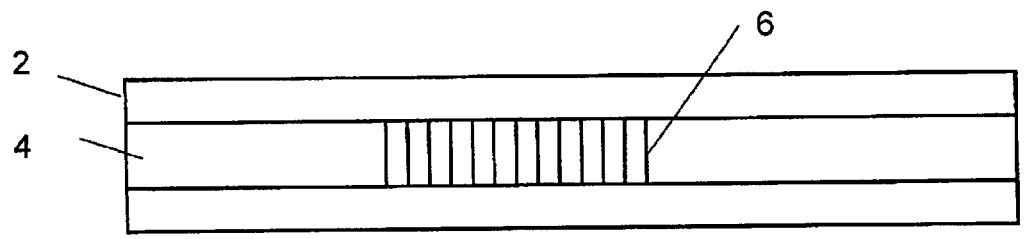
FIG. 2 shows the optical fiber wherein a Bragg grating has been impressed on the core.

As the next step in forming the optical fiber of the invention, the core is provided with a Bragg grating 6 having a plurality of spaced grating elements as shown in FIG. 2. Methods for forming such Bragg gratings are well known in the art. One method for making Bragg gratings in optical fibers involves further polymerizing the core and/or cladding photosensitive compositions by exposing the core to a pair of interfering, actinic light beams. Another method further polymerizes by exposure to actinic radiation through a phase mask grating by any of numerous methods well-known in those skilled in the art of diffraction gratings and holography. A phase mask is a phase grating; i.e., an optical element that imposes a periodic, or nearly periodic, phase modulation on the incident, actinic beam. However, it should be noted that in some cases it may be useful to provide an optical element that imposes a non-periodic phase modulation.

Figure 3:
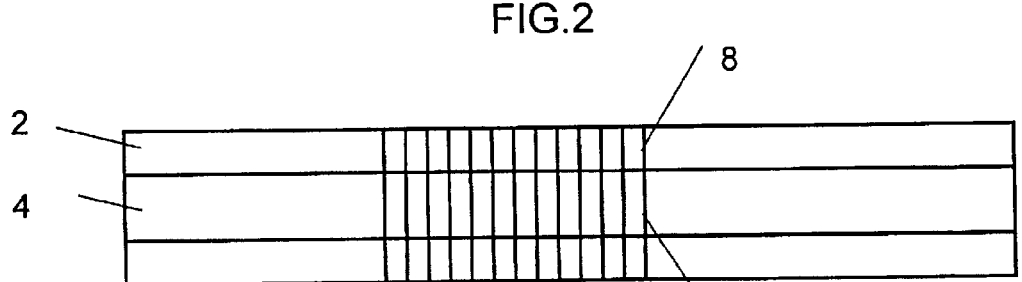
FIG. 3 shows an optical fiber wherein congruent Bragg gratings have been impressed on the cladding and the core.

In the embodiment of the invention as shown in FIG. 3, the cladding composition is formed from an actinic radiation curable composition which retains some residual photosensitivity such that upon exposure a congruent Bragg grating having a plurality of grating elements 8 is simultaneously imposed on the cladding as well as the core. The cure dose (total radiant energy per unit square of surface) for the grating producing step is typically from about 10 to about 500 times the dose employed to partially cure the cladding and core during the preceding fabrication steps. Ultimately the desired Bragg grating structure is locked in with this final curing step. In order to make the desired polymeric optical fibers, it is necessary to finely control the refractive index of various core and cladding. This can be achieved by tailoring the structure of the monomer used to achieve the desired refractive index. In practice, it is easier to blend several miscible monomers of different refractive indexes together to get the desired refractive index needed. When strongly reflecting gratings are required, it is also suitable to employ more than one monomer in the core and optionally in the cladding.

Optical fibers of the present invention may have any of a number of convenient cross-sectional shapes, such as circular, polygonal, square, rectangular, trapezoidal, and rounded such as following a parabolic or elliptical curve.

An aspect of the invention that is of particular utility is its application to thermo-optic devices which are tunable in their wavelength response. These devices function by using the fact that index of refraction for most materials is a function of temperature. For polymers the change in index of refraction with respect to temperature (dn/dT) is negative and large with respect to most inorganic materials. Specific contemplated devices include tunable filters based on gratings.

Figure 4:
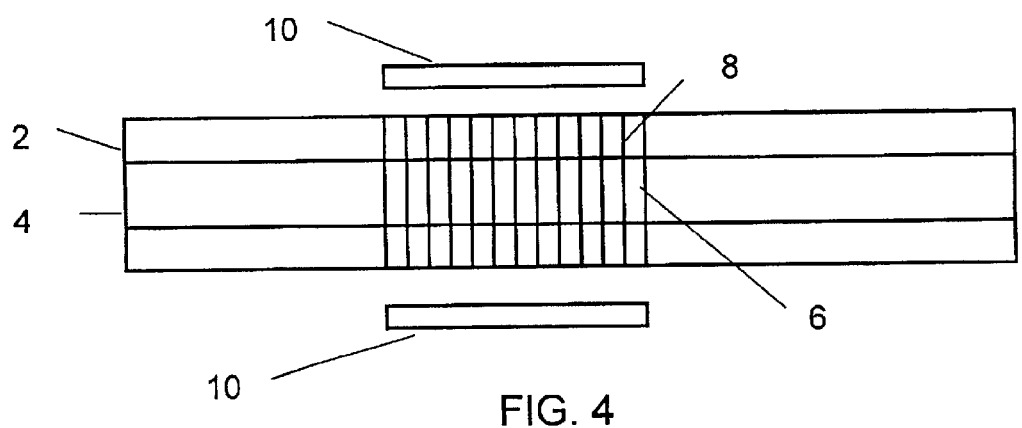
FIG. 4 shows the optical fiber arrangement including a means for changing the spacing between the grating elements.

Temperature tuning of a grating may be accomplished by a heater 10 on the outside surface of the cladding 2 as seen in FIG. 4. Applying power to the heater therefore establishes a thermal gradient wherein the grating elements, which have a fixed index of refraction, expand thus separating the grating elements.

Other means for changing the spacing of the grating elements non-exclusively include piezoelectric devices, mechanical straining devices, electric straining devices, magnetic straining devices and acoustic straining devices. The improved optical fiber of the present invention leads to lower loss and wider wavelength variation control than with glass gratings.

The following non-limiting examples serve to illustrate the invention.

EXAMPLE 1

A photopolymerizable cladding material is formed comprising a fluorinated tetraacrylate blended with a photoinitiator. The cladding composition is extruded through a tubular die and exposed at the exit of the die mouth to ultraviolet radiation thus forming a solid, flexible, transparent, tubular fiber having residual fluorinated tetraacrylate blended with the photoinitiator. A core photosensitive composition is then formed comprising a 92:8 weight percent fluorinated tetraacrylate/fluoroalkyl acrylate having 8 fluorine atoms, blended with a photoinitiator. This material has been chosen such that it has a higher refractive index than the cladding. The core photosensitive composition is then filled into the tubular fiber by capillary action. A phase mask is then positioned adjacent to a part of the filled tube at a distance of 0.5 mm. The entire filled tubular fiber is then exposed to UV light such that part of the filled tube is exposed through the phase mask an energy dose of 1.7 mJ per pulse at 30 pulses per second for 20 minutes. A Bragg grating having a plurality of spaced grating elements is observed on the cladding and the core at the portions exposed through the phase mask. The balance of the core and the cladding are substantially fully cured by the exposure dose.

EXAMPLE 2

Example 1 is repeated except the overcladding composition comprises 99 wt % of a fluorinated tetraacrylate F60TA and 1 wt % of a photoinitiator, Daracure® 1173, and the core mixture comprises 92 wt % of a fluorinated tetraacrylate F60TA, 7 wt % of a fluorinated diacrylate "C6DIACRY" and 1 wt % of photoinitiator, Darocure® 1173. Similar results are noted.

EXAMPLE 3

An optical fiber having a Bragg grating in the cladding and core is formed according to Example 1. The initial distance between the spacing elements is noted. An electric heater is positioned around the Bragg grating portion of the fiber. The temperature in the vicinity of the fiber is noted while the distance between the grating elements and light wavelength response are observed. Laser light is applied to one end of the fiber and the wavelength of light transmitted through the grating and reflected by the grating are noted. The heater is then turned on and the temperature gradually increased from room temperature to below the softening point of the fiber. At a series of temperature points the distance between the grating elements, the wavelength of light transmitted through the grating and the wavelength of light reflected by the grating are measured. The distance between the grating elements, the wavelength of light transmitted through the grating and the wavelength of light reflected by the grating are found to correlate with the applied temperature.

While the present invention has been particularly shown and described with reference to suitable embodiments, it will be readily appreciated by those of ordinary skill in the art that various changes and modifications may be made without departing from the spirit and scope of the invention. It is intended that the claims be interpreted to cover the disclosed embodiment, those alternatives which have been discussed above and all equivalents thereto.

What is claimed is:

1. A method for forming an optical fiber which comprises forming a hollow tubular cladding which comprises a first polymeric composition comprising a residual amount of a first actinic radiation polymerizable composition, said first polymeric composition having a first index of refraction, and said cladding having a longitudinal bore; filling the bore with a core of a second actinic radiation polymerizable composition through an open end of the hollow tubular cladding, and then partially polymerizing the second actinic radiation polymerizable composition to form a second polymeric composition which has a second index of refraction greater than the index of refraction of the first polymeric composition; simultaneously forming a Bragg grating having a plurality of spaced grating elements in the core and an additional Bragg grating having a plurality of spaced grating elements in the cladding which is congruent with the Bragg grating in the core by exposure of the first polymeric composition and the second polymeric composition to two beam interference pattern of ultraviolet radiation, or exposure to ultraviolet radiation through a phase mask; and positioning means for changing the spacing between the grating elements adjacent to the gratings.

2. The method of claim 1 wherein at least one of the first actinic radiation polymerizable composition and the second actinic radiation polymerizable composition comprise a polymerizable composition comprising a photoinitiator and a polymerizable compound including at least one fluorinated alkylene or alkylene ether moiety and at least two terminal acrylate moieties, each terminal acrylate moiety being connected to one of the fluorinated alkylene or fluorinated alkylene ether moieties by an ester linking group.

3. A method for forming an optical fiber which comprises forming a hollow tubular cladding which comprises a composition that is selected from the group consisting of a first polymeric composition and a first glass composition having a first index of refraction, said cladding having a longitudinal bore; filling the bore with a core of a polymerizable composition through an open end of the hollow tubular cladding, and then partially polymerizing the polymerizable composition to form a second polymeric composition which has a second index of refraction greater than the index of refraction of the first polymeric composition or the first glass composition; forming a Bragg grating having a plurality of spaced grating elements in the core; and means for changing the spacing between the grating elements.

4. The method for forming an optical fiber of claim 3 which comprises forming a hollow tubular cladding which comprises a first polymeric composition having a first index of refraction, said cladding having a longitudinal bore; filling the bore with a core of a polymerizable composition through an open end of the hollow tubular cladding, and then partially polymerizing the polymerizable composition to form a second polymeric composition which has a second index of refraction greater than the index of refraction of the first polymeric composition forming a Bragg grating having a plurality of spaced grating elements in the core; and means for changing the spacing between the grating elements.

5. The method of claim 4 wherein the polymerizable composition is actinic radiation polymerizable.

6. The method of claim 4 wherein the polymerizable composition comprises a combination of at least one ethylenically unsaturated monomer, oligomer or polymer and at least one photoinitiator.

7. The method of claim 4 wherein the polymerizable composition comprises a polymerizable composition comprising a photoinitiator and a polymerizable compound including at least one fluorinated alkylene or alkylene ether moiety and at least two terminal acrylate moieties, each terminal acrylate moiety being connected to one of the fluorinated alkylene or fluorinated alkylene ether moieties by an ester linking group.

8. The method of claim 4 wherein the first polymeric composition is formed from an actinic radiation polymerizable composition.

9. The method of claim 4 wherein at least one of the first polymeric composition and the second polymeric composition comprises a polymer or copolymer of a polymerizable compound including at least one fluorinated alkylene or alkylene ether moieties, and at least two terminal acrylate moieties, each terminal acrylated moiety being connected to one of the fluorinated alkylene or fluorinated alkylene ether moieties by an ester linking group.

10. The method of claim 4 wherein the first polymeric composition comprises a residual amount of unpolymerized actinic radiation polymerizable composition.

11. The method of claim 4 wherein the Bragg grating is formed by exposure of the second polymeric composition to two beam interference pattern of ultraviolet radiation, or exposure to ultraviolet radiation through a phase mask.

12. The method of claim 4 further comprising forming an additional Bragg grating having a plurality of spaced grating elements in the cladding which is congruent with the Bragg grating in the core.

13. An optical fiber made by the process of claim 4, comprising a hollow tubular cladding which comprises a first polymeric composition having a first index of refraction, said cladding having a hollow longitudinal bore; a core of a second polymeric composition filling the bore, which second polymeric, composition has a second index of refraction which is greater than the index of refraction of the first polymeric composition; a Bragg grating having a plurality of spaced grating elements formed in the core; and means for changing the spacing between the grating elements.

14. The method of claim 12 wherein the Bragg grating and the additional Bragg grating are formed simultaneously by exposure of the first polymeric composition and the second polymeric composition to two beam interference pattern of ultraviolet radiation, or exposure to ultraviolet radiation through a phase mask.

15. The method of claim 12 wherein the first polymeric composition comprises a residual amount of an unpolymerized actinic radiation polymerizable composition and wherein the Bragg grating and the additional Bragg grating are formed simultaneously by exposure of the first polymeric composition and the second polymeric composition to two beam interference pattern of ultraviolet radiation, or exposure to ultraviolet radiation through a phase mask.

16. The method for forming an optical fiber of claim 3, which comprises forming a hollow tubular cladding which comprises a first glass composition having a first index of refraction, said cladding having a longitudinal bore; filling the bore with a core of a polymerizable composition through an open end of the hollow tubular cladding, and then partially polymerizing the polymerizable composition to form a second polymeric composition which has a second index of refraction greater than the index of refraction of the first glass composition; fanning a Bragg grating having a plurality of spaced grating elements in the core; and means for changing the spacing between the grating elements.

17. The optical fiber made by the process of claim 16 comprising tubular cladding which comprises a first glass composition having a first index of refraction, said cladding having a longitudinal axis; a core of a second polymeric composition within the cladding extending along and around the longitudinal axis; the second polymeric composition having a second index of refraction which is greater than the index of refraction of the first glass composition: a Bragg crating having a plurality of spaced grating elements formed in the core; and means for chanting the spacing between the grating elements, and further comprising an additional Bragg grating having a plurality of spaced grating elements in the cladding which is congruent with the Bragg grating in the core.

18. The method of claim 16 further comprising forming an additional Bragg grating having a plurality of spaced grating elements in the cladding which is congruent with the Bragg grating in the core.

19. The method of claim 16 wherein the first glass composition comprises germanium-doped silica.

* * * * *